United States Patent [19]

Eppley

[11] 4,148,974

[45] Apr. 10, 1979

[54] STABLE ELECTROLYTE FOR RESERVE ELECTROCHEMICAL CELLS

[75] Inventor: William J. Eppley, Skippack, Pa.

[73] Assignee: Honeywell Inc., Minneapolis, Minn.

[21] Appl. No.: 748,983

[22] Filed: Dec. 9, 1976

[51] Int. Cl.² .................... H01M 6/14; H01M 6/38
[52] U.S. Cl. .................................. 429/101; 429/105;
429/113; 429/194
[58] Field of Search ............... 429/101, 105, 110, 113,
429/115, 116, 194, 199, 80, 218, 188

[56] References Cited

U.S. PATENT DOCUMENTS

| 3,567,515 | 3/1971 | Maricle et al. | 429/105 |
| 3,578,500 | 5/1971 | Maricle et al. | 429/194 X |
| 3,743,545 | 7/1973 | Merz et al. | 429/115 |
| 3,930,885 | 1/1976 | Dey | 429/116 |
| 3,953,234 | 4/1976 | Hoffmann | 429/199 |

Primary Examiner—Anthony Skapars
Attorney, Agent, or Firm—John S. Munday

[57] ABSTRACT

The use of lithium hexafluroarsenate dissolved in acetronitrile as an electrolyte in a reserve electrochemical cell having a lithium anode, a sulfur dioxide depolarizer and a means for maintaining the electrolyte and depolarizer remote from the anode prior to activation.

4 Claims, 1 Drawing Figure

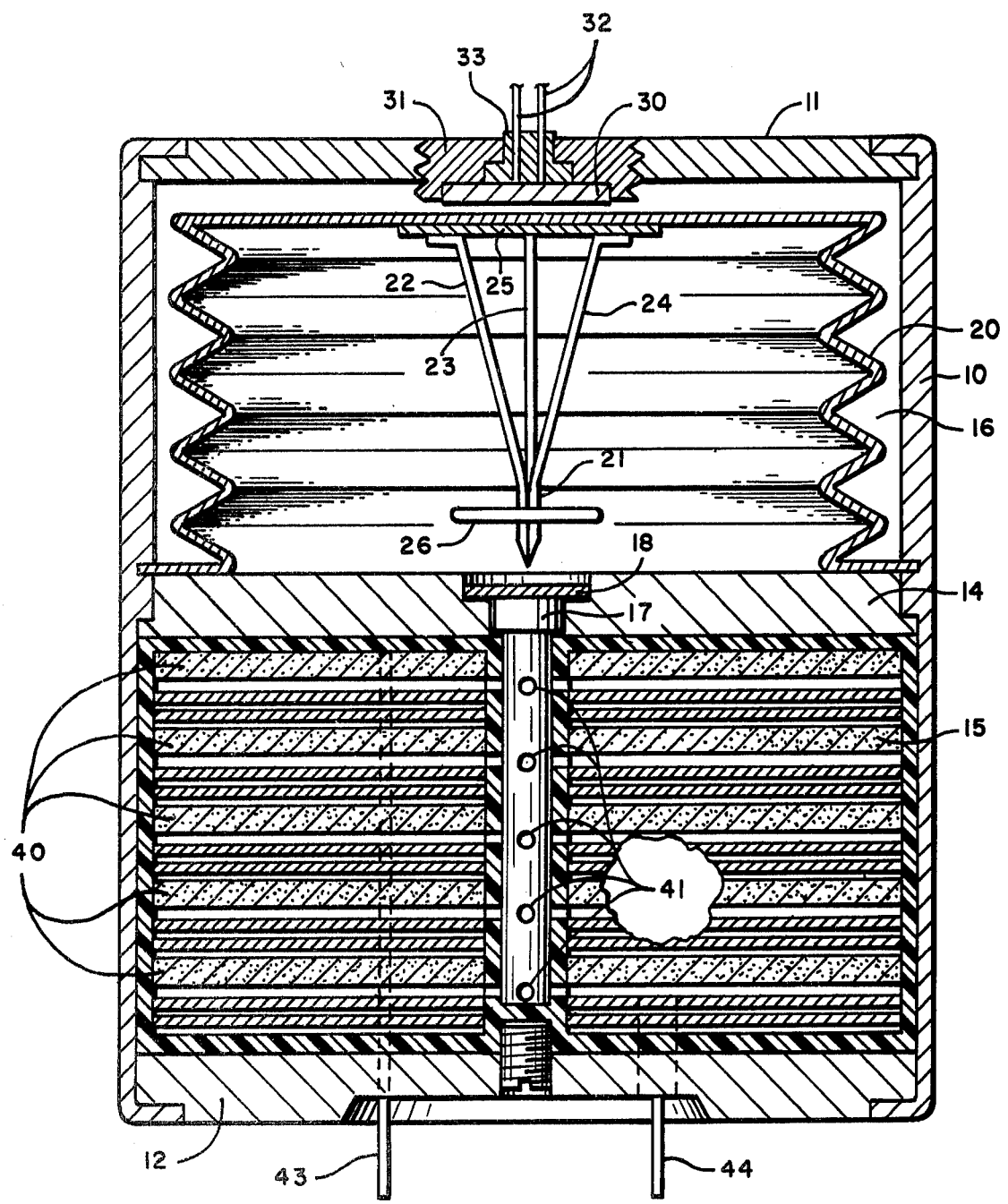

STABLE ELECTROLYTE FOR RESERVE ELECTROCHEMICAL CELLS

BACKGROUND OF THE INVENTION

Electrochemical cells in which lithium acts as an anode and sulfur dioxide acts as a depolarizer are becoming increasingly important as uses for these batteries are developed by the industry. The cells offer advantages of high energy and light weight, and much is being learned about these cells as efforts are made to increase the predictability and dependability of the cells employing lithium and sulfur dioxide.

Many patents disclose combinations of this type wherein lithium and sulfur dioxide are employed. One such patent, U.S. Pat. No. 3,567,515 discloses a system in which lithium is the anode, sulfur dioxide is the major cathode depolarizer and an electrolyte salt is dissolved in the sulfur dioxide, oftentimes along with a co-solvent. U.S. Pat. No. 3,578,500 discloses this same concept, along with the use of various soluble depolarizers acting with or instead of the sulfur dioxide, with the sulfur dioxide still performing the function of a solvent. So does U.S. Pat. No. 3,953,234.

As various cells are constructed to meet commercial objectives, using lithium and sulfur dioxide, various problems have developed requiring selection of components which are compatible with one another. Each of the above-referred to patents lists a substantial number of salts which may be dissolved in an equally substantial number of solvents, along with the sulfur dioxide.

One particular use for lithium sulfur dioxide electrochemical cells which has not yet achieved a significant commercial success is the reserve cell. These reserve cells, wherein a portion of the components making up the electrochemical reaction are segregated or remote from the remaining portion of the constituents, have a potential usefulness which is different from the active cell described in the above discussed patents. In an active cell, where all of the constituents of the electrochemical reaction are together, energy may be taken from the cell merely by applying a load. Substantial work has been done to completely understand all of the reactions which take place when lithium, sulfur dioxide, a salt, and possibly a co-solvent are present in one chamber. Conversely, when one or more of these constituents are not present in the system, such as in a reserve cell where one or more constituents are contained in a remote compartment, different reactions may take place between those constituents which are mixed together. Moreover, reactions between several constituents which are inhibited by the presence of a third constituent may be accelerated in the absence of that third constituent.

Reserve cells have achieved certain commercial successes employing various chemistries. One reserve cell system is disclosed in U.S. Pat. No. 3,743,545, in which an activation means is provided to transfer a quantity of electrolyte to the cell, thereby energizing the cell. Each set of constituents for the electrochemical cell described in this reference is compatible with those with which it is placed. Specifically, U.S. Pat. No. 3,743,545 deals with an ammonia battery system in which the ammonia and dissolved salts are maintained in a chamber remote from the electrochemical cell until operation of the cell is desired. Another useful reserve cell system is disclosed in U.S. Pat. No. 3,514,339.

It is an object of this invention to provide a cell in which both lithium and sulfur dioxide are employed in a manner known in the art, and in which sufficient constituents of the cell are separated from the remaining constituents so that no electrochemical reaction can take place until the constituents are all brought together.

BRIEF DESCRIPTION OF INVENTION

Specifically, it has been discovered that a new and useful electrochemical cell device can be constructed in the following manner. Specifically, a lithium anode is employed along with a cell completing mixture of solvent, salt and depolarizer which are maintained remote from the anode. The solvent, salt and depolarizer comprise acetronitrile, lithium hexafluroarsenate and sulfur dioxide, respectively. It is, of course, recognized that the sulfur dioxide functions as a co-solvent as well. Finally, reserve means includes a means for transferring the mixture to the anode upon command. Specific means for maintaining the cell completing mixture remote from the anode and for transferring the components to form a completed cell are disclosed.

DETAILED DESCRIPTION OF INVENTION

For a more complete understanding of the invention, reference is hereby made to the drawing, which describes an embodiment of the present invention.

Specifically, in the drawing, a reserve activated battery is shown having a housing with an external cylindrical shell 10. The shell is constructed of materials which are sufficiently strong to withstand the pressures generated inside the battery. A cover member 11 closes the upper end of the cylindrical shell 10. The bottom end of the shell is closed by a terminal plate 12 which carries the battery terminals and provides means for an electrical connection from the inside to the outside of the battery housing. A bulkhead 14 separates the cylindrical housing into two compartments or chambers, a battery compartment 15 and a liquid storage compartment 16. Bulkhead 14 has a central aperture 17, providing a passage between liquid storage compartment 16 and battery compartment 15. A diaphram 18 is positioned within aperture 17 to close the passage until activation of the battery is desired. Diaphram 18 is constructed of material such that it can be ruptured by piercing.

A compressible reservoir cup 20 is mounted within the liquid storage compartment 16. A cup is mounted with its open end against the bulkhead 14, such that upon compression of cup 20, the only path open to the liquid flow is through passage 17 into battery compartment 15.

Mounted within reservoir cup 20, at a location opposite opening 17 and diaphram 18, is a lance 21. Lance 21 has a pointed lower end facing diaphram 18. The lance, which is collapsible, is constructed of three pieces of stainless steel wire 22, 23 and 24, molded together and forming a pointed end of the lance. At the other end, the three wires are welded to a disc 25 in three separate locations, providing a stable tripod configuration. At the pointed end of the lance and slightly above it, a cross member 26 is welded. Cross member 26 is longer than the cross section of opening 17 in bulkhead 14. The purpose of the cross member is to prevent the penetration of the lance further into the battery compartment 15.

At the center of cover member 11 is located a gas generating assembly comprising a chemical propellant or gas generator 30 held by a gas generator cup 31 threaded into cover member 11. A part of lead wires 32 are brought into contact with chemical propellant 30 through a plastic plug 33.

Battery compartment 15 contains a battery cell shown at 40. This cell is arranged around a central column which is coactual with the cylindrical shell 10 and which extends the entire heighth of battery compartment 15. The central column has a bore extending the entire length of battery compartment 15, from a passage 17 in bulkhead 14 to terminal plate 12. A plurality of apertures 41 are provided from the central column into the battery. The liquid is thus allowed to flow from compartment 16 into cells 40 by means of the bore in the central column in the apertures 41.

Terminal plate 12 carries positive and negative terminals 43 and 44. These cells may be arranged in a series configuration forming a cell stack, or, if desired, a single cell may be placed within the battery compartment 15. The number and arrangement of cells will be determined by the end use to which the battery is put. Terminal 43 is connected by means of a conductor to the upper end of the cell or cells, while terminal 44 is connected to the lower end of the cell or cells.

Reservoir cup 20 is shown in a preferred embodiment as constructed in the form of a bellows. In this configuration, the cup can be easily compressed by application of force to the exterior of the cup. The reservoir cup could also take other forms, such as, for example, the deformible activator cup of the type shown in U.S. Pat. No. 3,239,385.

As has been stated above, the anode of the electrochemical cell of this invention is lithium. This lithium anode is placed within the battery compartment 15. Contained within the reservoir cup 20 is a cell completing mixture of solvent, salt and depolarizer. Specifically, according to the present invention, acetonitrile and sulfur dioxide act as co-solvents, with lithium hexafluroarsenate comprising the salt and sulfur dioxide comprising the depolarizer. Since, when the salt is dissolved in the solvent, the entire mixture is fluid, it can be rapidly transferred from the reservoir cup to the battery compartment upon activation of the transfer means.

As shown in the figure, there is provided a reserve means which includes means for transferring the mixture to the anode upon command. Activation may be caused by applying a potential to lead wires 32 of the gas generating assembly. The gas generating assembly may, in one embodiment, utilize a moderate rate chemical propellant 30 activated by an application of electrical potential by means of a suitable source of electrical energy, not shown in the drawing but connected to by means of lead wires 32. Upon application of the electrical potential to the chemical propellant 30, the propellant ignites and thereafter burns at a predetermined rate to generate the gas. The generation of the gas results in an increased pressure within compartment 16, external to reservoir cup 20. Sufficient pressure is generated to compress cup 20 and force the sharp end of lance 21 downward through diaphram 18. Diaphram 18 is pierced by the sharp point of lance 21 and then is further ruptured by the increased pressure within the fluid and by the liquid rushing through opening 17 into battery compartment 15. All that is needed is sufficient gas propellant to overcome the pressure of the cell completing mixture, including the sulfur dioxide, contained in the reservoir cup 20.

To demonstrate the efficiencies of the present intention, several experiments were performed employing reserve activated batteries. Other tests used glass ampule reserve chambers. All of the cells were provided with a lithium anode in the battery chamber. Contained in the reservoir cup was a depolarizer comprising sulfur dioxide, a solvent and a salt. In one set of cells, acetonitrile was employed as the solvent. A one molal solution of lithium bromide was utilized as a salt. After approximately 10 days, the combination of sulfur dioxide, acetronitrile, and lithium bromide had turned to a solid black mass of material which was incapable of operating as an electrochemical cell, and, further, could not even be transferred from the reservoir cup to the battery chamber. Thus, this cell was incapable of functioning as an electrochemical cell after storage of less than two weeks.

A second set of cells was prepared using the lithium anode in the battery compartment, the sulfur dioxide as the depolarizer, acetonitrile as the co-solvent, and a one molal solution of lithium hexafluoroarsenate dissolved therein as the salt. These cells were found to be completely stable. Specifically, after 190 days of storage, a sample laboratory cell was discharged. A discharge curve was, within experimental error, exactly the same as fresh cell, having an open circuit voltage of 2.9 volts. A second cell was taken apart to permit analysis of the cell completing mixture stored in the reservoir cup. Specifically, after 340 days of reserve life, the mixture of sulfur dioxide, acetonitrile, and lithium hexafluroarsenate was analyzed using infrared spectroscopy. The results were identical to that of a fresh mixture. Visual inspection of the cells using the system of this invention showed apparently no change in the cell completing mixture, as stored in the reservoir cup, after over 400 days of storage, more than 40 times that of the other system. Thus it can be seen that the present invention provides a reserve cell which employs the high energy and efficiencies of lithium and sulfur dioxide, and yet which permits storage of the cell as a reserve cell for over a year at high temperatures (165° F.) without adverse effects.

Having thus described the invention, what is claimed is:

1. An electrochemical cell device, comprising: a lithium anode; a cell completing mixture remote from said anode, comprising acetonitrile, lithium hexafluroarsenate and sulfur dioxide; and reserve means for admixing said anode and said cell completing mixture to form an electrochemical cell.

2. The device of claim 1 wherein said reserve means includes means for transferring said mixture to said anode upon command.

3. An electrochemical cell device, comprising: a first chamber containing a lithium anode, and space for an electrolyte and depolarizer; a second chamber remote from said first chamber and containing an electrolyte comprising acetonitrile and lithium hexafluroarsenate, and a quantity of sulfur dioxide as a depolarizer; and means for transferring said electrolyte and said depolarizer from said second chamber to said first chamber to activate said cell.

4. The device of claim 3 wherein said first chamber contains a plurality of lithium anodes and cathode collectors connected in series to form a multicell battery.

* * * * *